Sept. 23, 1952     B. GROSS     2,611,285
SEALING DEVICE
Filed Nov. 25, 1949

INVENTOR.
Bernard Gross

Patented Sept. 23, 1952

2,611,285

UNITED STATES PATENT OFFICE 2,611,285

SEALING DEVICE

Bernard Gross, San Diego, Calif., assignor, by mesne assignments, to Rohr Aircraft Corporation, a corporation of California Application November 25, 1949, Serial No. 129,253

2 Claims. (Cl. 78—54)

My invention relates to sealing devices employed for sealing rivets, bolts, screws or the like, particularly those of the countersunk type.

The principal object of the invention is to provide means for hermetically sealing a conventional insert type fastener, such as a rivet or bolt, where such fasteners are required to have resistance to leakage, as in the fabrication of pressure vessels, integral fuel tanks in the wings of aircraft, gas chambers, pressure accumulators, pressurized airplane cabins or compartments, fluid-tight bulkheads in air or watercraft, water-tight hulls of seaplanes and ships, etc.

Another object is to provide a sealing device of the class described above which is economical to manufacture and dependable under extreme conditions of fluid pressure, temperature changes, and mechanical stress.

Another object is to provide a sealing device of the class described above, having a sufficient margin of efficiency to insure against leakage even in the case of minor irregularities in the installation of a fastener, such as for example, a flat spot on the shank of the fastener, carelessness on the part of the operator in drilling, countersinking, etc.

Another object is to provide a sealing device of the class described above, which will not detract from shear values obtained with conventional fasteners.

Still another object is to provide a sealing device for countersunk insert type fasteners.

These and other objects will appear as the invention is hereinafter described and set forth.

With the advent of high speed aircraft, it has become essential to utilize countersunk fasteners in the outside skin to eliminate air friction and turbulence caused by the protruding heads of other type fasteners. Seaplane hulls and floats and high speed water craft similarly require the use of countersunk fasteners in their construction. With the development of high speed aircraft has come the heightening of service ceiling, requiring the pressurization of cabins. To reduce weight and increase fuel carrying capacities, integral wing tanks are being utilized. In such applications where sealing is required, it is essential that some sealing means be used in conjunction with the countersunk fasteners, or leaks will occur during service. Countersunk, or other standard insert fasteners of the type currently used, are incapable of maintaining an effective seal. As a result, it is impossible to properly maintain cabin pressurization; the hulls and floats of seaplanes leak, requiring the use of bilge pumps; and leaking gasoline tanks cause fires, resulting in loss of life as well as of planes and equipment. The trend in modern aircraft design, toward the attainment of still greater speeds and altitude, will impose greater requirements for the effective sealing of fasteners.

A countersunk rivet or other such fastener must fit perfectly into the aperture into which it is inserted, in order to obtain initial seal. However, during operation or while in service, vibration imposes reverse stresses and weaving creates shear loads which generally loosen the fasteners, causing leaks to occur.

Many attempts have been made to install countersunk fasteners in such a way as to maintain effective seal under operative conditions, but prior to this invention, none has been successful. The application of various compounds around the heads of the fasteners, prior to installation, has proved unsuccessful because metal to metal contact between the fastener and the materials to be secured was not possible and therefore, either the fastener could not be tightened, or because of cold flow of the compound (if resilient), the fastener loosens after installation. If the compound were to harden, it would either crack and loose its seal, or compress the same as solid metal under vibration or shear load, whereupon the fasteners would loosen and the seal would again be lost.

The application of sealing compounds around the base of the fastener is not satisfactory because of seepage between the layers of metal fastened to the shank and around the head of the fastener. The detection of leaks under such conditions is difficult, if not impossible.

A recent development has been the manufacture of a special, countersunk rivet with annular ridges fashioned on the underside of the head. When this rivet is driven, the ridges imbed themselves into the layer of material to be fastened and a fair initial seal is accomplished. However, these ridges tend to prevent the head of the rivet from properly seating itself into the aperture intended, thereby preventing contact of the entire head surface with the faying surface of the aperture. While the device facilitates initial seal, the life of the seal during service conditions is less than that of a carefully installed conventional countersunk fastener, because of inadequate bearing surface.

The sealing device described in this specification is the result of further research and experimentation following development of sealing devices, which were the subject matter of my unexpired earlier U. S. Patent No. 2,396,005. The invention has been subjected to exhaustive vibration and weaving tests in the laboratories of Rohr Aircraft Corporation, and has been found to maintain effective seal without exception. Shear strengths equal to or greater than those obtained with conventional fasteners, are possible. The device is simple and economical in its manufacture and installation.

Essentially, my invention consists of a specially formed disc shaped retainer which compresses a resilient ring of rubber-like material. To utilize my invention in the joining of sheet metal or other parts, the operator will drill a hole through the parts to be fastened, countersink the outer surface of one part to receive the head of the fastener (in the case of countersunk type fasteners), and counterbore the other part (or extreme opposite part, in the case of multiple laminations) to receive my sealing device. The fastener is then inserted in the conventional manner and the sealing device installed around the shank of the fastener and into the counterbored hole. The fastener is then tightened in a conventional manner.

During the tightening operation the rubber-like ring is compressed within the recess formed between the specially designed retainer, the shank of the fastener and the bottom surface of the counterbored hole into which the sealing device has been placed. The cross sectional area of the rubber-like ring is slightly larger than that of the said recess, and is designed so that after the fastener has been tightened, the rubber-like material will not only fill the recess, but will be compressed just sufficiently to effect a positive seal, in a manner somewhat similar to that of a gland packing. The metal to metal contact of the fastener, the sealing device, and the parts joined, will prevent the undue compression of the rubber-like substance, i. e., will prevent its being compressed beyond a point producing permanent deformation. Where it is desired to seal against a specific substance, such as fuel, a rubber-like material offering resistance to that substance is used in the ring. For example, an aromatic fuel resistant synthetic rubber, or other suitable material, will be used against gasoline.

Attention is invited to the accompanying drawing, illustrating preferred forms of my invention, in which similar numerals of designation refer to similar parts throughout the several views, and in which.

Figure 1:
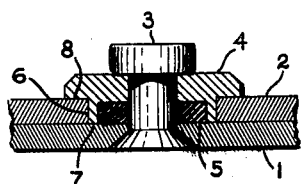
Figure 1 is a sectional view of two metal parts which have been fastened together by means of a countersunk rivet, showing the application of my sealing device in securing and hermetically sealing the shank of the rivet, and in which the rubber-like ring is shown compressed.
Figure 2:
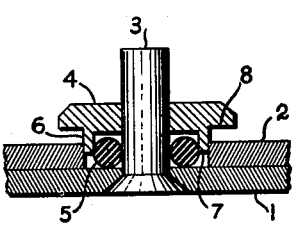
Figure 2 is a sectional view, the same as Figure 1, before the rivet has been tightened.
Figure 3:
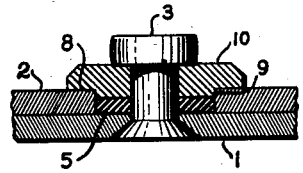
Figure 3 is a sectional view of the sealing device, showing a form of retainer without the annular shear wall shown in Figures 1, 2, 4, 6 and 7.
Figure 4:
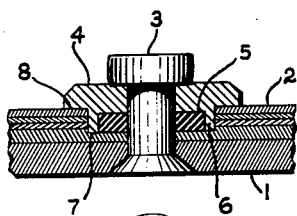
Figure 4 illustrates an arrangement where the depth of the counterbored hole exceeds the thickness of metal part 2 and extends into several intermediate laminations.
Figure 5:
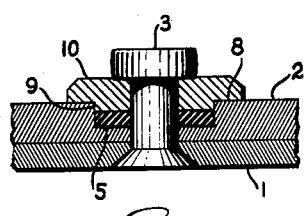
Figure 5 illustrates an arrangement where the depth of the counterbored hole is less than the thickness of the metal part 2.
Figure 6:
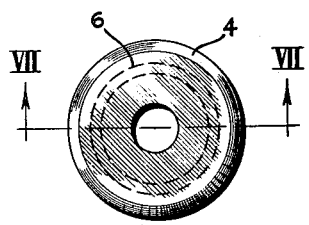
Figure 6 is a plan view of the retainer 4.

Referring to the drawing, the metal part 1 and the metal part 2, which are to be fastened together, are drilled, and the metal part 1 is countersunk in a conventional manner, to accommodate the head of the fastener 3. Prior to the insertion of the fastener 3, the metal part 2 is counterbored to a depth matching that of shear wall 6. It is to be noted, however, that in certain cases (as illustrated in Figure 4) the depth of the counterbored hole will exceed the thickness of metal part 2. The diameter of the counterbore is just sufficient to accommodate the outside diameter of said shear wall 6, of the retainer 4, as shown in Figures 1, 2 and 4. To fasten the parts, the fastener 3 is inserted in a conventional manner and the sealing device, consisting of the specially designed retainer 4 and the rubber-like ring 5, is installed around the shank of the fastener 3 and into the counterbored hole in part 2, as shown in Figure 2. The fastener is then tightened in a conventional manner. With the tightening of the fastener 3, the retainer 4 is seated into the counterbored hole (as shown in Figures 1 and 4), causing the rubber-like ring 5 (located therewithin) to be compressed, said ring 5 having a slightly larger cross-sectional area (before compression) than that of the recess area formed between the retainer 4, the shank of the fastener 3 and said bottom surface of counterbored hole. As shown in Figures 1 and 4, the edge surface 7 of the shear wall 6, meets the bottom surface of the counterbored hole, while the bearing shoulder 8 of retainer 4 bears upon the outer surface of part 2. Metal to metal contact is thereupon established, prohibiting overcompression of said ring 5 during completion of the tightening operation.

Figure 7:
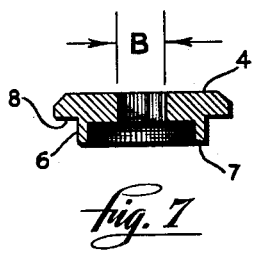
Figure 7 is a sectional view of Figure 6, along the line designated VII—VII.
Figure 8:
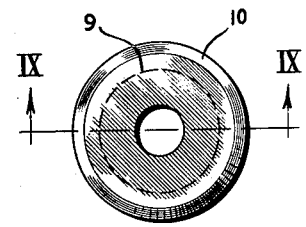
Figure 8 is a plan view of the retainer 10.
Figure 9:
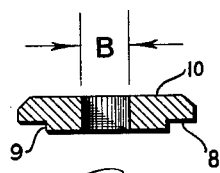
Figure 9 is a sectional view of Figure 8, along the line designated IX—IX.
Figure 10:
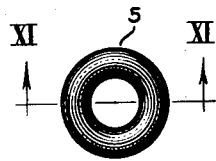
Figure 10 is a plan view of the rubber-like ring 5.
Figure 11:
Figure 11, is a sectional view of Figure 10 along the line designated XI—XI.

Referring to Figures 7 and 9, hole diameter B will vary in accordance with the shank diameter of the fastener used, providing in all cases, for a "slip fit."

Referring to Figures 3, 5, 8 and 9, showing a modified form of the retainer portion of my device, the retainer 10 has a shear-curb 9, the function of which is similar to that of the shear wall 6 of retainer 4 shown in Figures 1, 2, 4, 6, and 7. However, it may be seen that the retainer 10 does not contact the bottom surface of the counterbored hole, and the rubber-like ring 5 is compressed directly against the wall surface of said counterbored hole.

The preparatory operations, prior to the installation of retainer 10 are the same as described for retainer 4; the diameter of the counterbored hole being just sufficient to receive the diameter of shear-curb 9, and the depth of said counterbored hole being set to a predetermined standard.

Forms other than those shown and described hereinbefore, may be given to my invention, without deviation from the original spirit or basic principle thereof; the scope of the invention being indicated by the appended claims, and all changes which come within the range of equivalency of the claims are intended to be embraced therein.

What I claim as my invention and desire to protect by Letters Patent is:

1. A laminated metal structure comprising: upper and lower abutting sheets; a rivet having a cylindrical shank and a lower head in contact with the lower sheet; the lower sheet having an opening adapted to pass the rivet shank and the upper sheet having a cylindrical opening extending entirely therethrough and through which the rivet shank passes; a disc shaped rigid retainer whose diameter is substantially greater than the diameter of said cylindrical opening; said retainer having a depending cylindrical projection having a free sliding fit with the marginal wall of said cylindrical opening; a torus shaped ring of highly resilient material disposed within said cylindrical opening around the rivet shank, the length of the rivet shank being sufficient that upon its being upset to form a rivet head, the formed head presses against the top of said retainer to draw the sheets together and cause the base of said cylindrical projection to press against said ring by an amount just sufficient to force the ring into sealing contact with the rivet shank, the marginal wall of the cylindrical opening and the upper face of the lower sheet, but insufficient to produce permanent deformation of the ring.

2. A laminated structure as claimed in claim 1; in which the opening in the lower sheet is tapered and the lower rivet head is correspondingly tapered to seat against the marginal wall of the tapered opening to provide a head flush with the exposed surface of the lower sheet.

BERNARD GROSS.

REFERENCES CITED

The following references are of record in the file of this patent:

UNITED STATES PATENTS

| Number | Name | Date |
| --- | --- | --- |
| 951,437 | Gehrke | Mar. 8, 1910 |
| 1,006,623 | Barrett | Oct. 24, 1911 |
| 1,045,389 | Gillmor | Nov. 26, 1912 |
| 1,551,382 | Foss | Aug. 25, 1925 |
| 1,643,484 | Beckfield | Sept. 27, 1927 |
| 1,708,736 | Pallady | Apr. 9, 1929 |
| 2,050,060 | Morris | Sept. 8, 1936 |
| 2,277,885 | Rodanet | Mar. 31, 1942 |
| 2,320,947 | Martin | June 1, 1943 |
| 2,360,274 | Rapp | Oct. 10, 1944 |
| 2,396,005 | Gross | Mar. 5, 1946 |
| 2,403,247 | Sullivan | July 2, 1946 |